United States Patent [19]
Zerfass et al.

[11] Patent Number: 4,535,526
[45] Date of Patent: Aug. 20, 1985

[54] METHOD FOR COVERING A LENGTH OF PIPE

[75] Inventors: Karl C. Zerfass; Martin Urban, both of Wiesbaden, Fed. Rep. of Germany

[73] Assignee: Hoechst Aktiengesellschaft, Frankfurt am Main, Fed. Rep. of Germany

[21] Appl. No.: 456,983

[22] Filed: Jan. 10, 1983

Related U.S. Application Data

[63] Continuation of Ser. No. 27,648, Apr. 6, 1979, abandoned.

[30] Foreign Application Priority Data

Apr. 7, 1978 [DE] Fed. Rep. of Germany ....... 2815049

[51] Int. Cl.³ .............................................. B21D 35/00
[52] U.S. Cl. ..................................... 29/469.5; 29/505; 138/149; 138/151; 428/36; 428/463
[58] Field of Search ............... 29/505, 469.5; 156/272; 138/151, 147, 139, 149; 428/36, 461, 463

[56] References Cited

U.S. PATENT DOCUMENTS

| 2,937,665 | 5/1960 | Kennedy | 428/36 X |
| 3,382,136 | 5/1968 | Bugel et al. | 428/463 X |
| 3,434,502 | 3/1969 | Snelling | 138/149 X |
| 3,556,887 | 1/1971 | Adcock | 156/272 |
| 3,740,306 | 6/1973 | Kosbab et al. | 428/461 X |
| 4,006,275 | 2/1977 | Monia | 428/36 |
| 4,105,118 | 8/1978 | Williams et al. | 428/463 X |

FOREIGN PATENT DOCUMENTS

| 1934386 | 5/1970 | Fed. Rep. of Germany | 428/461 |
| 9975 | 5/1896 | United Kingdom | 138/151 |

Primary Examiner—Charlie T. Moon
Attorney, Agent, or Firm—Schwartz, Jeffery, Schwaab, Mack, Blumenthal & Evans

[57] ABSTRACT

Disclosed is a laminated foil which is free from elastic memory, comprising a carrier layer of rigid PVC, polyethylene or polypropylene, and an aluminum layer bonded thereto. Also disclosed are a process of using the foil to wrap pipes and several articles of manufacture made from the foil.

12 Claims, 4 Drawing Figures

METHOD FOR COVERING A LENGTH OF PIPE

This is a continuation of application Ser. No. 027,648, filed Apr. 6, 1979, now abandoned.

BACKGROUND OF THE INVENTION

The invention relates to laminated foils and more especially to plastic-based laminated foils which are free from elastic memory and which can be bent at room temperature into a permanent shape. These foils are comprised of a carrier layer of rigid polyvinylchloride (PVC), polyethylene or polypropylene, and a layer of aluminum bonded thereto.

The invention further relates to processes for jacketing straight, in particular insulated, lengths of pipe by forming shells, in the shape of a hollow cylinder, of the foil according to the invention around such lengths of pipe, and to the use of the foil according to the invention to produce wrapped pipes and for the manufacture of prismatic shaped articles.

Within the scope of the description of the invention, the term "foil" embraces foils in the shape of a foil web, in the shape of a length of a foil web wound up about the longitudinal axis to form a stock roll, and cut pieces, preferably rectangular cut pieces, of foil.

Within the scope of the description of the present invention, the term "polyethylene sheeting" is defined to embrace polyethylene sheets which exhibit a characteristic rigidity comparable with that of rigid PVC sheeting of approximately comparable thickness; sheeting made from polyethylene of high density (0.940 to 0.966) and high crystallinity (75 to 95%) is representative of such rigidity.

Polyethylene, polypropylene and in particular rigid PVC sheetings are all characterized by an inherent elastic memory at room temperature. One group of sheeting, which in the original state is virtually flat, tends, after being curved at room temperature, to independently and rapidly reassume, and to retain the original flat shape. In the case of another group of known sheeting of polyethylene, polypropylene and especially rigid PVC, such sheeting is, in the original state, in a durably highly curved condition and exhibits a powerful permanent elastic memory so that, after lying plane at room temperature, it tends to independently and rapidly reassume, and to retain its original curved shape.

The pronounced elastic memory of known sheeting made from rigid PVC, polyethylene or polypropylene, especially of sheeting having a thickness of from 200 to 750 $\mu$m, is a disadvantage when the sheeting is used at room temperature, for example, for wrapping containers or pipes, inasmuch as it is only with special and additional measures that a single operative is capable of forming a cut piece of sheeting of appropriate length into a jacket around the container or around the length of pipe.

Aluminum foils have the disadvantage, in handling and use, that they are very prone to crease and have a low tear initiation and tear propagation resistance.

SUMMARY OF THE INVENTION

It is an object of the invention to provide an improved laminated foil.

It is a particular object of the invention to provide a laminated foil which can be bent into a permanent shape at room temperature, and which does not exhibit the disadvantages of the known sheeting made from rigid PVC, polyethylene or polypropylene, or of aluminum foils.

It is a further object of the invention to provide a laminated foil which can be shaped in a simple manner by bending at room temperature and, after removal of the shaping force, does not tend independently to alter the three-dimensional shape which has been imparted to it.

Another object of the invention resides in the provision of a method of wrapping objects with the laminated foil according to the invention.

In accomplishing the objects of the present invention, there has been provided a laminated foil which is free from elastic memory, comprising a carrier layer of rigid PVC, polyethylene or polypropylene having a thickness in the range from about 200 to 750 $\mu$m, preferably from about 300 to 400 $\mu$m, and an aluminum layer having a thickness in the range from about 25 to 100 $\mu$m, preferably from about 30 to 50 $\mu$m bonded thereto.

In accordance with another aspect of the present invention, there has been provided a process for using the above foil for wrapping straight, preferably insulated, lengths of pipe, comprising the steps of cutting a piece of foil of appropriate length at right angles to the longitudinal axis of the foil web, and forming around the pipe, a cylindrical shell, slit along the longitudinal axis, from the piece of foil, wherein the piece of foil is bent, at room temperature, round the pipe, with two parallel limiting edges approaching one another, until the cut piece of foil forms a shell which is in the shape of a hollow cylinder, which is slit along the longitudinal axis, which has an independently stable shape, and which rests against the pipe.

The invention also provides an article of manufacture comprising a three-dimensionally shaped article constructed of the foil defined above. This article is preferably either a prismatic structure or comprises a pipe surrounded by cylindrical covering of said foil.

Other objects, features and advantages of the subject invention will become apparent from the detailed description of preferred embodiments which follows, when considered together with the attached figures of drawing.

DETAILED DESCRIPTION OF PREFERRED EMBODIMENTS

Figure 1:
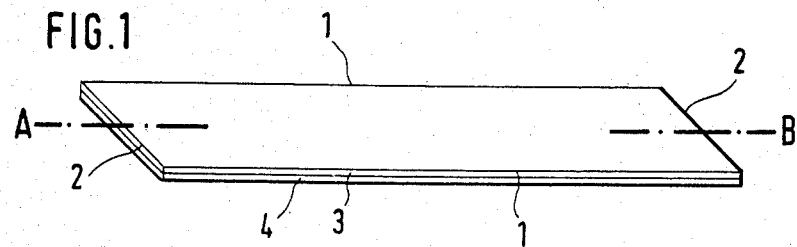
FIG. 1 shows schematically and in perspective a cut piece of foil according to the invention which is capable of independently lying flat, the piece being spread out in the plane A/B.

According to the invention there is provided a foil which can be bent into a permanent shape at room temperature, has a laminate-like layer structure and is free from elastic memory, and which comprises a carrier layer of rigid PVC or polyethylene or polypropylene and a layer of aluminum located on at least one of the surfaces of the carrier layer and bonded thereto.

The present invention embraces foil webs, cut pieces of foil, especially rectangular cut pieces, and a foil stock roll, consisting of a foil web wound up lengthwise, possessing the characteristics of the present invention. The foil is particularly useful for the purpose of manufacturing a foil jacket, in particular for insulated straight lengths of pipe, by means of a process in which a length of the flexible foil corresponding to the circumference of the pipe to be jacketed is drawn off the stock roll, cut off, laid round the pipe and then, if desired, bonded at the cut edges.

The foil web which forms the foil roll will independently lie flat before starting to wind it up. A piece of foil, cut from the stock roll and having a length corresponding to the circumference of the particular roll, will in each case independently exhibit a stable shape.

The foil according to the invention possesses a carrier layer of rigid PVC, polyethylene or polypropylene, having a thickness in the range of from about 200 to 750 $\mu$m, preferably in the range of from about 300 to 400 $\mu$m; the aluminum layer bonded to the carrier layer has a thickness in the range of from about 25 to 100 $\mu$m, preferably from about 30 to 50 $\mu$m, and the stated limiting values of the thicknesses of the layers forming the laminate are related to one another, i.e. a carrier layer having a thickness of about 200 $\mu$m is, e.g., bonded to an aluminum layer of about 25 $\mu$m, whereas a carrier layer having a thickness of about 750 $\mu$m is, e.g., bonded to an aluminum layer of about 100 $\mu$m. The aluminum layer in the foil laminate is crease-resistant.

The term "foil free from elastic memory" is defined to mean that a rectangular piece of the foil, at room temperature, is both capable of independently lying flat, and of independently exhibiting a stable shape. The terms "capable of independently exhibiting a stable shape" and "capable of independently lying flat" mean, in relation to the term "foil free from elastic memory", that a body, which can be produced by bending a rectangular piece of foil at room temperature so as to curve it about its longitudinal axis, the body being in the shape of a hollow cylinder slit along its longitudinal axis, will at room temperature, because of its independent stability of shape, not tend independently to alter the shape imparted to it by bending, and that the curved piece of foil which forms the hollow cylinder can, at room temperature, again be spread out in a plane, and when spread out in this way will, because of its independent capacity to lie flat, not tend to curve independently. The convertibility from one spatial shape to the other is thus reversible.

A laminate foil which can be bent at room temperature into a permanent shape is to be understood, in shapes according to the present invention, to be a foil which can be shaped at room temperature by bending, with the particular spatial shape not tending to alter its shape independently, with once again the convertibility of the spatial structure from one shape to the other being reversible.

The cut piece of foil which exhibits the said properties has, for example, a length of 40 cm and a width of 15 cm; it can be taken from a foil in web or roll form, or from another cut piece of foil.

The method of manufacture of the foil according to the invention will be explained in relation to an example where the carrier layer consists of rigid PVC, on one surface of which is located an aluminum layer.

Adhesives for firmly bonding sheeting of rigid PVC, polyethylene or polypropylene to aluminum foils are known and do not form the subject of the present invention. The chemical adhesive used for the adhesive lamination process can for example consist of a polyurethane-based chemical substance dissolved in a suitable organic solvent. The thickness of the adhesive layer which provides the adhesion between the plastic layer and the aluminum layer of the foil according to the invention is negligibly low and does not contribute to the rigidity of the laminate.

A rigid PVC sheeting web, which is, for example, 300 $\mu$m thick, is firmly bonded by gluing, on one surface, to an aluminum foil which is, for example, 40 $\mu$m thick. The chemical adhesive used for the adhesive lamination process consists, for example, of a polyurethane-based chemical substance dissolved in a suitable organic solvent.

The adhesive is applied to the surface of the PVC carrier sheeting or to the surface of the aluminum foil or to both the surface of the aluminum foil and the surface of the PVC carrier sheeting, and the foils which are of dimensions corresponding to one another are then congruently joined so that the layer which produces the bond is located between the carrier sheeting and the aluminum layer.

Advantageously, the laminate formed is subjected to heat and/or pressure so as to accelerate the bonding. The manufacture of laminate foil webs according to the invention can be carried out continuously or piece-by-piece, by means of known equipment.

Foil laminates wherein the carrier sheeting consists of polyethylene or polypropylene can be manufactured in the same manner; in that case, for example, the plastic carrier sheeting has a thickness of about 250 $\mu$m and the aluminum layer a thickness of about 35 $\mu$m. The chemical adhesive used can be, for example, a polyurethane 2-component adhesive. The foil laminates consisting of a carrier layer of polyethylene or polypropylene and a layer of aluminum can also be produced by extrusion coating (in a conventional manner) of an aluminum foil of suitable thickness by means of polyethylene or polypropylene, with the polyethylene or polypropylene layer having a thickness within the stated range.

The invention will be further illustrated by the following specific examples, which are intended to be illustrative only and not limitative of the subject invention.

EXAMPLE 1

Jacketing of a straight length of pipe with a cut piece of a foil according to the invention A rectangular piece of foil is severed, transversely to the direction of the web, from a foil web wound up in the longitudinal direction to form a stock roll, the web consisting of a foil of laminated structure, which is free from elastic memory and comprises a 350 $\mu$m thick carrier layer of rigid PVC and a 50 $\mu$m thick aluminum layer bonded thereto by gluing; the length of the severed piece—determined by the edges of the web—is such that it at least corresponds to the circumference of the pipe which is to be wrapped. The piece of foil is then placed against and around the straight pipe which is to be wrapped therewith, in such a way that the longitudinal axis of the pipe and the axis of the piece of foil which corresponds to the longitudinal axis of the foil web are at right angles.

The piece of foil is then bent around the pipe at room temperature, for example manually, and for example in such a way that the parallel cut edges of the piece of foil move toward one another and, after the bending operation has been concluded, that is to say after the shell has been formed around the pipe, they run parallel, and immediately adjacent, to one another. In a preferred embodiment, the regions of the shell in the vicinity of the cut edges are arranged to overlap. By lightly pressing the hollow cylinder foil shell against the pipe jacketed therewith, a shell-like jacket which is independently of stable shape and rests closely against the pipe is formed.

If required, it is possible to secure an adhesive tape which is correspondingly narrow but sufficiently wide over the entire length of the longitudinal slit of the hollow cylinder shell-like jacket or of the over-lap zone thereof.

If the length of the cut piece of foil is chosen to be greater than that corresponding to the circumference of the pipe, a shell in the shape of a hollow cylindrical body, slit along the longitudinal axis but with overlapping edge zones, can be placed around the pipe.

The wrapping of the pipe with a cut piece of foil can, without difficulties, be carried out by a single operative requiring no special skill.

It is particularly advantageous to jacket the pipe in such a way that the aluminum layer of the foil forms the outer face of the shell-like foil jacket, in the shape of a hollow cylinder and slit along the longitudinal axis, which has been formed around the pipe. The aluminum outer layer, preferably with an additional lacquer coating, makes the shell-like foil jacket particularly resistant to the action of light and weather, so that, in particular, pipelines laid in the open can advantageously be jacketed with the foil according to the invention. The aluminum outer layer of the shell-like jacket additionally contributes to the low flammability of the shell-like jacket and especially substantially to a reduction in the tendency to generate smoke.

If the rectangular piece of foil has been severed from a foil web the width of which corresponds at least to the circumference of the pipe to be jacketed, the piece of foil can also be placed against, and around, the pipe to be jacketed therewith in such a way that the axis of the piece of foil, corresponding to the longitudinal axis of the foil web, runs parallel to the pipe axis, the bending operation being carried out so that the longitudinal edges of the piece of foil, which correspond to the web edges, move toward one another.

Because of the special character of the foil according to the invention, the last-mentioned variant makes it possible, with the aid of longer pieces of foil which have been cut off a corresponding stock roll transversely to the web direction, to apply to the pipe cylindrical shells which are slit along the longitudinal axis but are free from a break over their circumference.

EXAMPLE 2

The procedure of Example 1 is repeated, except for the difference that in the employed foil according to the invention, the carrier layer consists of polyethylene and has a thickness of 250 $\mu$m and the aluminum layer has a thickness of 35 $\mu$m.

The chemical adhesive which firmly bonds the two layers to one another consists of a polyurethane 2-component adhesive.

EXAMPLE 3

The procedure of Example 1 is repeated, except for the difference that the employed foil according to the invention has a carrier layer of polypropylene, of thickness 250 $\mu$m, whilst the aluminum layer is 35 $\mu$m thick.

The adhesive layer which bonds the two layers together consists of a polyurethane 2-component adhesive.

EXAMPLE 4

Production of a prismatic shaped article

A flat rectangular cut piece of a foil which is free from elastic memory and consists of a 500 $\mu$m thick rigid PVC carrier sheeting and a 60 $\mu$m thick aluminum foil located on the carrier sheeting and attached thereto by gluing, is bent, by forming straight folding edges running parallel and equidistant from one another, to give a prismatic body which is rectangular in cross-section and is slit along the longitudinal axis. The bending operation is carried out at room temperature, as in Example 1. The outer face of the prismatic body can serve to carry advertising matter; for example, it can be provided with an inscription or with advertising stickers.

EXAMPLE 5

Production of a folded box

A sheet-like structure which can be folded to form a container-shaped body open at the top is produced by punching-out of a cut piece, of defined size, from a piece of foil according to the invention.

Referring now to the drawings, in FIG. 1, reference numeral 1 denotes the longitudinal edges of the cut piece, which correspond to the longitudinal edges of a foil web from which the cut piece has been severed transversely to the longitudinal axis of the foil web. Reference numeral 2 denotes the cut edges of the cut piece, reference numeral 3 denotes the rigid PVC carrier sheeting and 4 denotes the aluminum layer located on the carrier sheeting. The broken line A/B indicates the plane in which the cut piece of foil is spread out and is capable of independently lying flat.

Figure 2A:
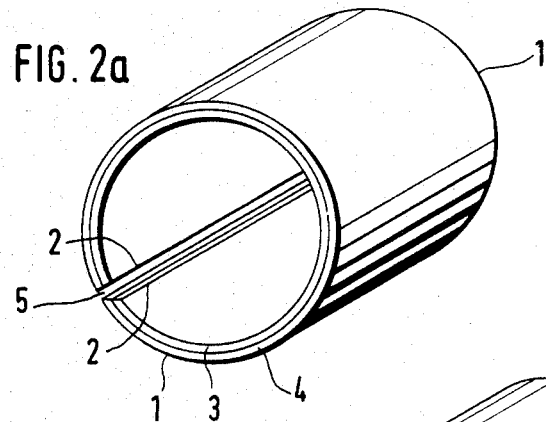
FIGS. 2a and 2b each show, schematically and in perspective, the ring-like bodies produced by bending a cut piece of foil according to FIG. 1 in such a way that parallel edges of the cut piece are moved toward one another and the aluminum layer of the foil laminate forms the outer face of the ring-like body.

In FIG. 2a, the numerals 1 to 4 have the same meaning as in FIG. 1. Reference numeral 5 denotes a slit, along the longitudinal axis, in the jacket of the ring-shaped body, in the zone of which slit the end-face edges 2 of the cut piece of foil run parallel to one another and in the immediate vicinity of one another. The ring-shaped body is produced from a foil strip according to FIG. 1 by bending the latter about a bending axis, which runs at right angles to the longitudinal axis A/B of the foil strip, at room temperature, in such a way and to such an extent, that the end-face edges 2 of the foil strip move toward one another and then run parallel and immediately adjacent to one another.

Figure 2B:
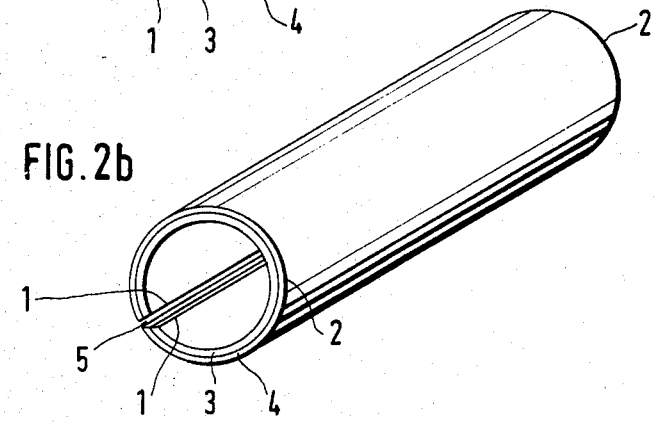

FIG. 2b shows a ring-shaped body which differs from the body according to FIG. 2a in that its length corresponds to the length of the edges 1 of the cut piece of foil according to FIG. 1, while in the ring-shaped body according to FIG. 2a, its length corresponds to the length of the end-face edges 2 of the cut piece according to FIG. 1.

The ring-shaped body according to FIG. 2b can be produced from a cut piece according to FIG. 1 by bending the latter about its longitudinal axis in such a way that the longitudinal edges 1 of the cut piece move toward one another and the aluminum layer 4 forms the outer face of the ring-shaped body. In FIG. 2b the numerals 1 to 5 have the same meaning as in FIG. 2a.

Figure 3:
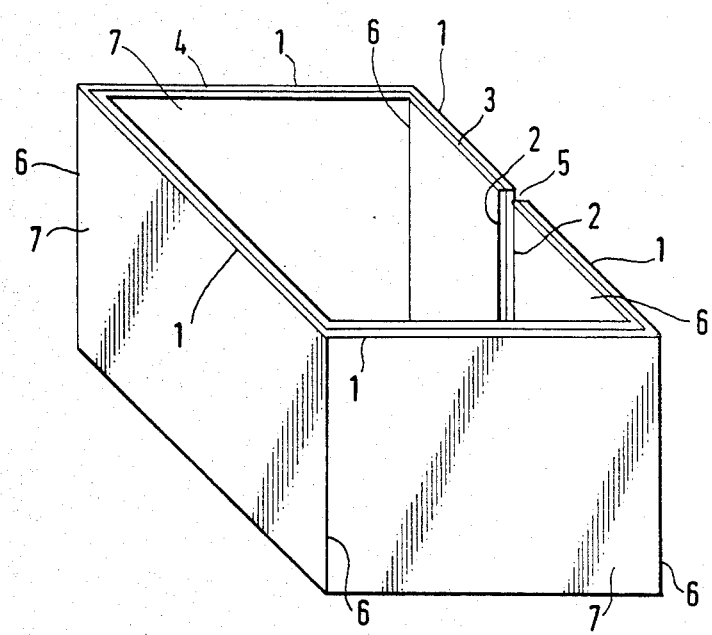
FIG. 3 shows a prismatic body of rectangular cross-section, slit along the longitudinal axis, which has been produced by folding a cut piece of foil according to FIG. 1.

In FIG. 3 is illustrated a box-like article produced by bending the laminated foil of the invention in a rectangular configuration having four right-angle corners 6 and flat inside and outside wall surfaces 7.

What is claimed is:

1. A process for using a laminated foil which is free from elastic memory, comprising the steps of:
   (1) cutting from a foil web a predetermined length of foil at right angles to the longitudinal axis of said foil web, said foil consisting essentially of;
      (a) a carrier layer having a thickness between 300 μm and 400 μm and comprising a polymeric material selected from the group consisting of rigid PVC, polyethylene and polypropylene,
      (b) directly adjacent to said carrier layer, a single layer of adhesive having a negligibly small thickness such that it does not contribute to the rigidity of the laminate, and
      (c) a layer of aluminum bonded directly to one side only of said carrier layer, said aluminum layer being directly adjacent to said adhesive layer and having a thickness between about 25 and about 100 μm,
   the relative thickness of said carrier layer and said aluminum layer being selected so that the laminated foil is free from elastic memory, such that a rectangular piece of the laminated foil is capable at room temperature of both independently lying flat and of independently exhibiting a stable shape when a shape is imparted to it by bending and the laminated foil can be reversibly converted from any desired spatial shape to another and will not tend to independently alter the shape imparted to it;
   (2) bending said foil, at room temperature, around a length of pipe to fit said foil in a formfitting manner to said length of pipe with said carrier layer against said pipe, said foil having an independently stable shape after said bending.

2. A process according to claim 1, wherein said predetermined length of said foil at least corresponds to the circumference of the pipe.

3. A process according to claim 1, wherein the foil is bent around the pipe in such a way that the axis of the foil which corresponds to the longitudinal axis of the foil web runs at right angles of the axis of the pipe.

4. A process according to claim 1, wherein said foil web has a width which at least corresponds to the circumference of the pipe, and said foil cut from the foil web is placed around the pipe in such a way that the axis of the foil which corresponds to the longitudinal axis of the foil web runs parallel to a major axis of said pipe.

5. A process according to claim 1, wherein the foil comprises a rigid PVC carrier layer and an aluminum layer having a thickness in the range from about 30 to 50 μm.

6. A process according to claim 1, wherein the foil comprises a polyethylene carrier layer and an aluminum layer having a thickness in the range from about 25 to 100 μm.

7. A process according to claim 1, wherein the foil comprises a polypropylene carrier layer and an aluminum layer having a thickness in the range from about 25 to 100 μm.

8. A process according to claim 1, wherein the foil comprises a carrier layer comprising polyethylene having a density in the range of from about 0.940 to 0.966 g/cm$^3$ and a crystallinity in the range from about 75 to 95%, and the aluminum layer has a thickness in the range from about 30 to 50 μm.

9. A process according to claim 7, wherein the foil comprises a polypropylene carrier layer and an aluminum layer having a thickness in the range from about 30 to 50 μm.

10. A process according to claim 1, wherein step (2) comprises forming a covering around said length of pipe with said length of foil, said covering having a slit along its longitudinal axis and an independently stable shape.

11. A process according to claim 1, wherein said carrier layer comprises rigid PVC and has a thickness of about 300 μm, and said aluminum layer has a thickness of about 40 μm.

12. A process according to claim 1, wherein said carrier layer comprises rigid PVC and has a thickness of about 400 μm, and said aluminum layer has a thickness of about 50 μm.

* * * * *